United States Patent
Gorin et al.

(10) Patent No.: US 7,620,548 B2
(45) Date of Patent: *Nov. 17, 2009

(54) METHOD AND SYSTEM FOR AUTOMATIC DETECTING MORPHEMES IN A TASK CLASSIFICATION SYSTEM USING LATTICES

(75) Inventors: Allen Louis Gorin, Berkley Heights, NJ (US); Dijana Petrovska-Delacretaz, Fribourg (CH); Giuseppe Riccardi, Hoboken, NJ (US); Jeremy Huntley Wright, Berkeley Heights, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 47 days.

This patent is subject to a terminal disclaimer.

(21) Appl. No.: 11/854,720

(22) Filed: Sep. 13, 2007

(65) Prior Publication Data
US 2008/0046243 A1    Feb. 21, 2008

Related U.S. Application Data

(60) Division of application No. 10/158,082, filed on May 31, 2002, now Pat. No. 7,286,984, and a continuation-in-part of application No. 09/690,903, filed on Oct. 18, 2000, now Pat. No. 6,681,206, and a continuation-in-part of application No. 09/690,721, filed on Oct. 18, 2000, now Pat. No. 7,085,720.

(60) Provisional application No. 60/322,447, filed on Sep. 17, 2001, provisional application No. 60/163,838, filed on Nov. 5, 1999.

(51) Int. Cl.
*G10L 15/06* (2006.01)

(52) U.S. Cl. .............................. 704/251; 74/252; 74/257

(58) Field of Classification Search ................. 704/251, 704/252, 257
See application file for complete search history.

(56) References Cited

U.S. PATENT DOCUMENTS

| | | | |
|---|---|---|---|
| 4,777,600 | A | 10/1988 | Saito et al. |
| 4,827,521 | A | 5/1989 | Bahl et al. |
| 4,866,778 | A | 9/1989 | Baker |
| 4,882,759 | A | 11/1989 | Bahl et al. |
| 4,903,305 | A | 2/1990 | Gillick et al. |
| 5,029,214 | A | 7/1991 | Hollander |
| 5,033,088 | A | 7/1991 | Shipman |
| 5,062,047 | A | 10/1991 | Tanaka et al. |
| 5,099,425 | A | 3/1992 | Kanno et al. |

(Continued)

OTHER PUBLICATIONS

A.L. Gorin et al. U.S. Appl. No. 10/158,082, "Method and System for Automatically Detecting Morphemes in a Task Classification System Using Lattices", filed May 31, 2002.

(Continued)

*Primary Examiner*—Daniel D Abebe (57) ABSTRACT

The invention concerns a method and system for detecting morphemes in a user's communication. The method may include recognizing a lattice of phone strings from the user's input communication, the lattice representing a distribution over the phone strings, and detecting morphemes in the user's input communication using the lattice. The morphemes may be acoustic and/or non-acoustic. The morphemes may represent any unit or sub-unit of communication including phones, diphones, phone-phrases, syllables, grammars, words, gestures, tablet strokes, body movements, mouse clicks, etc. The training speech may be verbal, non-verbal, a combination of verbal and non-verbal, or multimodal.

15 Claims, 12 Drawing Sheets

U.S. PATENT DOCUMENTS

| | | | |
|---|---|---|---|
| 5,210,689 A | 5/1993 | Baker | |
| 5,212,730 A | 5/1993 | Wheatley et al. | |
| 5,297,039 A | 3/1994 | Kanaegami et al. | |
| 5,323,316 A | 6/1994 | Kadashevich et al. | |
| 5,333,275 A | 7/1994 | Wheatley et al. | |
| 5,337,232 A | 8/1994 | Sakai et al. | |
| 5,357,596 A | 10/1994 | Takebayashi et al. | |
| 5,375,164 A | 12/1994 | Jennings | |
| 5,384,892 A | 1/1995 | Strong | |
| 5,390,272 A | 2/1995 | Repta et al. | |
| 5,434,906 A | 7/1995 | Robinson et al. | |
| 5,457,768 A | 10/1995 | Tsubio et al. | |
| 5,500,920 A | 3/1996 | Kupiec | |
| 5,509,104 A | 4/1996 | Lee et al. | |
| 5,544,050 A | 8/1996 | Abe et al. | |
| 5,619,410 A | 4/1997 | Emori et al. | |
| 5,642,519 A | 6/1997 | Martin | |
| 5,651,095 A | 7/1997 | Ogden | |
| 5,666,400 A | 9/1997 | McAllister et al. | |
| 5,675,707 A | 10/1997 | Gorin et al. | |
| 5,719,921 A | 2/1998 | Vysotsky et al. | |
| 5,724,481 A * | 3/1998 | Garberg et al. | 704/243 |
| 5,752,230 A | 5/1998 | Alonso-Cedo | |
| 5,794,193 A | 8/1998 | Gorin et al. | |
| 5,832,480 A | 11/1998 | Byrd et al. | |
| 5,839,106 A | 11/1998 | Bellegarda | |
| 5,860,063 A | 1/1999 | Gorin et al. | |
| 5,878,390 A | 3/1999 | Kawai et al. | |
| 5,905,774 A | 5/1999 | Tatchell et al. | |
| 5,918,222 A | 6/1999 | Fukui et al. | |
| 5,960,447 A | 9/1999 | Holt et al. | |
| 6,006,186 A | 12/1999 | Chen et al. | |
| 6,021,384 A | 2/2000 | Gorin et al. | |
| 6,023,673 A | 2/2000 | Bakis et al. | |
| 6,044,337 A | 3/2000 | Gorin et al. | |
| 6,064,957 A | 5/2000 | Brandow et al. | |
| 6,138,085 A | 10/2000 | Richardson et al. | |
| 6,173,261 B1 | 1/2001 | Arai et al. | |
| 6,192,110 B1 | 2/2001 | Abella et al. | |
| 6,208,964 B1 | 3/2001 | Sabourin | |
| 6,233,553 B1 * | 5/2001 | Contolini et al. | 704/220 |
| 6,243,683 B1 | 6/2001 | Peters | |
| 6,308,156 B1 | 10/2001 | Barry et al. | |
| 6,311,152 B1 | 10/2001 | Bai et al. | |
| 6,317,707 B1 | 11/2001 | Bangalore et al. | |
| 6,397,179 B2 | 5/2002 | Crespo et al. | |
| 6,681,206 B1 | 1/2004 | Gorin et al. | |
| 6,895,377 B2 | 5/2005 | Kroeker et al. | |
| 6,941,266 B1 | 9/2005 | Gorin et al. | |
| 6,961,954 B1 | 11/2005 | Maybury et al. | |
| 7,085,720 B1 | 8/2006 | Gorin et al. | |
| 7,158,935 B1 | 1/2007 | Gorin et al. | |
| 2004/0199375 A1 | 10/2004 | Ehsani et al. | |

OTHER PUBLICATIONS

A.L. Gorin et al., "How May I Help You?", AT&T Labs Research, pp. 1-4, as it was to appear in the Proc. Of IVITA, Philadelphia, Oct. 1996.

Aberdeen et al., Mitre: Description of the Alembic system as used in MET, 1996, Proceedings of the Tipster 24-Month Workshop, pp. 461-462.

U.S. Appl. No. 09/699,494, filed Oct. 2000, Gorin et al.

U.S. Appl. No. 09/699,495, filed Oct. 2000, Gorin et al.

U.S. Appl. No. 09/699,496, filed Oct. 2000, Gorin et al.

A.L. Gorin, "Processing of Semantic Information In Fluently Spoken Language", to appear in the Proceedings of the Int;\I. Conf. On Spoken Language Processing (CSLP), Oct. 1996, AT&T Research, pp. 1-4.

A.L. Gorin et al., "Spoken Language Acquisition for Automated Call Routing in a Telephone Network", Proceedings 1993 IEEE Workshop on Automatic Speech Recognition, Dec. 12-15, 1993, pp. 99-100.

A.L. Gorin et al. "Spoken Dialog as a Feedback control System", ESCA Workshop on Spoken Dialogue Systems—Theories and Applications, Vigso, Denmark, May 30-Jun. 2, 1995, AT&T Bell Laboratories, pp. 173-175.

A.L. Gorin et al., "Spoken Language Acquisition for Automated Call Routing", ICSLP 94, 1994 International Conference of Spoken Language Processing, Sep. 18-22, 1994, Pacific Convention Plaza Yokohama, pp. 1483-1486.

A.L. Gorin et al., "On Automated Language Acquisition" J. Accoust. Soc. Am. 97(6) Jun. 1995, pp. 3441-3461.

A. L. Gorin et al., "An Experiment in Spoken Language Acquisition", IEEE Transactions on Speech and Audio Processing, vol. 2, No. 1, Par II, Jan. 1994, pp. 224-240.

A.L. Gorin et al., "Automated Call Routng in a Telecommunications Network", Proceedings, Second IEEE Workshop On Interactive Voice Technology for Telecommunications Applications, Sep. 26-27, 1994, pp. 137-140.

R. Cole et al., "The Challenge of Spoken Language Systems: I Research Direction for the Nineties", IEEE Transactions on Speech and Audio Processing; Jan. 1995, vol. 3, Issue 1, pp. 1-21.

L.G. Miller et al., "A Structured Network Architecture for Adaptive Language Acquisition", ICASSP '92: Acoustics, Speech & Signal Processing Conference; 1992, vol. 1, I-201-I-204.

A.L. Gorin et al., "On Adaptive Acquisition of Spoken Language", Neural Networks for Signal Processing, 1991; 1991, pp. 422-431.

Ponceleon et al., "Automatic Discovery of Salient Segments in Imperfect Speech Transcripts", CIKM '01, Atlanta, Georgia, Nov. 5-10, 2001.

* cited by examiner

| Phr. Nu. | $P_{max}$ | Salient Phone Phrase |
|---|---|---|
| $f_1$ | 0.81 | K ax l eh K T |
| $f_2$ | 0.91 | K ax l eh K T K ao l |
| $f_3$ | 0.91 | bos K ax l eh K T K ao l |
| $f_4$ | 0.97 | K ax l eh K T K ao l eos |
|  |  |  |
| $f_5$ | 0.87 | K l ay K K |
| $f_6$ | 0.92 | K l ay K K ao l D |
| $f_7$ | 0.91 | P l ey s ih K l ay K |
| $f_8$ | 0.94 | P l e y s ih K l ay K K ao l |

| EXPERIMENT | NO DETECTIONS |
|---|---|
| BEST PATH | 42% |
| PRUNED | 12% |
| FULL LATTICE | 6% |

| LATTICE | r | P(F_c) | P(W) |
|---|---|---|---|
| BEST PATH | 1.00 | 0.028 | 0.071 |
| PRUNED | 0.05 | 0.042 | - |
| FULL LATTICE | 0.00 | 0.080 | - |

FIG. 17

| LATTICE | r | $P(F_c \backslash c)$ | $P(c \backslash F_c)$ |
|---|---|---|---|
| BEST PATH | 1.00 | 0.16 | 0.93 |
| PRUNED | 0.05 | 0.20 | 0.90 |
| FULL LATTICE | 0.00 | 0.31 | 0.71 |

FIG. 18

| LATTICE | r | $P(F_c \backslash W)$ | $P(F_c \backslash \overline{W})$ |
|---|---|---|---|
| BEST PATH | 1.00 | 0.38 | 0.001 |
| PRUNED | 0.05 | 0.53 | 0.004 |
| FULL LATTICE | 0.00 | 0.66 | 0.035 |

FIG. 19

METHOD AND SYSTEM FOR AUTOMATIC DETECTING MORPHEMES IN A TASK CLASSIFICATION SYSTEM USING LATTICES

This application is a Divisional application of U.S. patent application Ser. No. 10/158,082, filed May 31, 2002 and incorporated herein by reference in its entirety, which claims the benefit of U.S. Provisional Patent Application No. 60/322,447, filed Sep. 17, 2001, which is incorporated herein by reference in its entirety, and is also a continuation-in-part of U.S. patent applications Ser. Nos. 09/690,721 and 09/690,903 both filed Oct. 18, 2000, which claim priority from U.S. Provisional Application No. 60/163,838, filed Nov. 5, 1999. U.S. patent applications Ser. Nos. 09/690,721, 09/690,903, 11/420,082 and U.S. Provisional Application No. 60/163,838 are incorporated herein by reference in their entireties.

TECHNICAL FIELD

The invention relates to automated systems for communication recognition and understanding.

BACKGROUND OF THE INVENTION

Conventional methods for constructing and training statistical models for recognition and understanding involve collecting and annotating large speech corpora for a task. This speech is manually transcribed and each utterance is then semantically labeled. The resultant database is exploited to train stochastic language models for recognition and understanding. These models are further adapted for different dialog states. Examples of such methods are shown in U.S. Pat. Nos. 5,675,707, 5,860,063, 6,044,337, 6,192,110, and 6,173,261, each of which is incorporated by reference herein in its entirety.

This transcription and labeling process is a major bottleneck in new application development and refinement of existing ones. For incremental training of a deployed automated dialog system, current technology would potentially require transcribing millions of transactions. This process is both time-consuming and prohibitively expensive.

SUMMARY OF THE INVENTION

The invention concerns a method and system for detecting morphemes in a user's communication. The method may include recognizing a lattice of phone strings from the user's input communication, the lattice representing a distribution over the phone strings, and detecting morphemes in the user's input communication using the lattice.

The morphemes may be acoustic and/or non-acoustic. The morphemes may represent any unit or sub-unit of communication including phones, diphones, phone-phrases, syllables, grammars, words, gestures, tablet strokes, body movements, mouse clicks, etc. The training speech may be verbal, non-verbal, a combination of verbal and non-verbal, or multimodal.

BRIEF DESCRIPTION OF THE DRAWINGS

The invention is described in detail with reference to the following drawings wherein like numerals reference like elements, and wherein.

DETAILED DESCRIPTION OF THE PREFERRED EMBODIMENTS

This invention concerns a dialog system that automatically learns from speech without transcriptions. Semantic labels can be extracted automatically from either experiments or from autonomous dialogs. In particular, a task-independent phone-recognizer is taught how to 'learn to understand' from a database of untranscribed (or transcribed) speech plus semantic labels.

Baseline approaches to the teaching of a speech recognition systems to understand are found in U.S. Pat. Nos. 5,675,707, 5,860,063, 6,044,337, 6,192,110 and 6,173,261, which are incorporated herein by reference in their entireties.

The earliest work demonstrated automatic acquisition of 'words' and 'grammar' from collapsed text. That work did not address, however, the issues arising from non-perfect recognition of speech. The next step was to show how to acquire lexical units from speech alone without transcription and exploit them for spoken language understanding (SLU). That experiment, however, was constrained to speech comprising isolated word sequences and used matching techniques to decide if an observation was a new 'word' or variation of a known 'word'.

All of the above efforts involve learning from speech alone. While one can learn much about a spoken language by merely listening to it, the process can progress further and faster by exploiting semantics. This has been demonstrated in both the engineering domain and in analyses of children's language acquisition. Thus, this invention goes beyond the past efforts by exploiting speech plus meaning using morphemes, both acoustic and non-acoustic, in order to teach a machine to learn to understand.

While the morphemes may be non-acoustic (i.e., made up of non-verbal sub-morphemes such as tablet strokes, gestures, body movements, etc.), for ease of discussion, the systems and methods illustrated in the drawings and discussed in the below concern only acoustic morphemes. Consequently, the invention should not be limited to just acoustic morphemes and should encompass the utilization of any sub-units of any known or future method of communication for the purposes of recognition and understanding.

Furthermore, while the terms "speech", "phrase" and "utterance", used throughout the description below, may connote only spoken language, it is important to note in the context of this invention, "speech", "phrase" and "utterance" may include verbal and/or non-verbal sub-units (or sub-morphemes). Therefore, "speech", "phrase" and "utterance" may comprise non-verbal sub-units, verbal sub-units or a combination of verbal and non-verbal sub-units within the sprit and scope of this invention.

Figure 1:
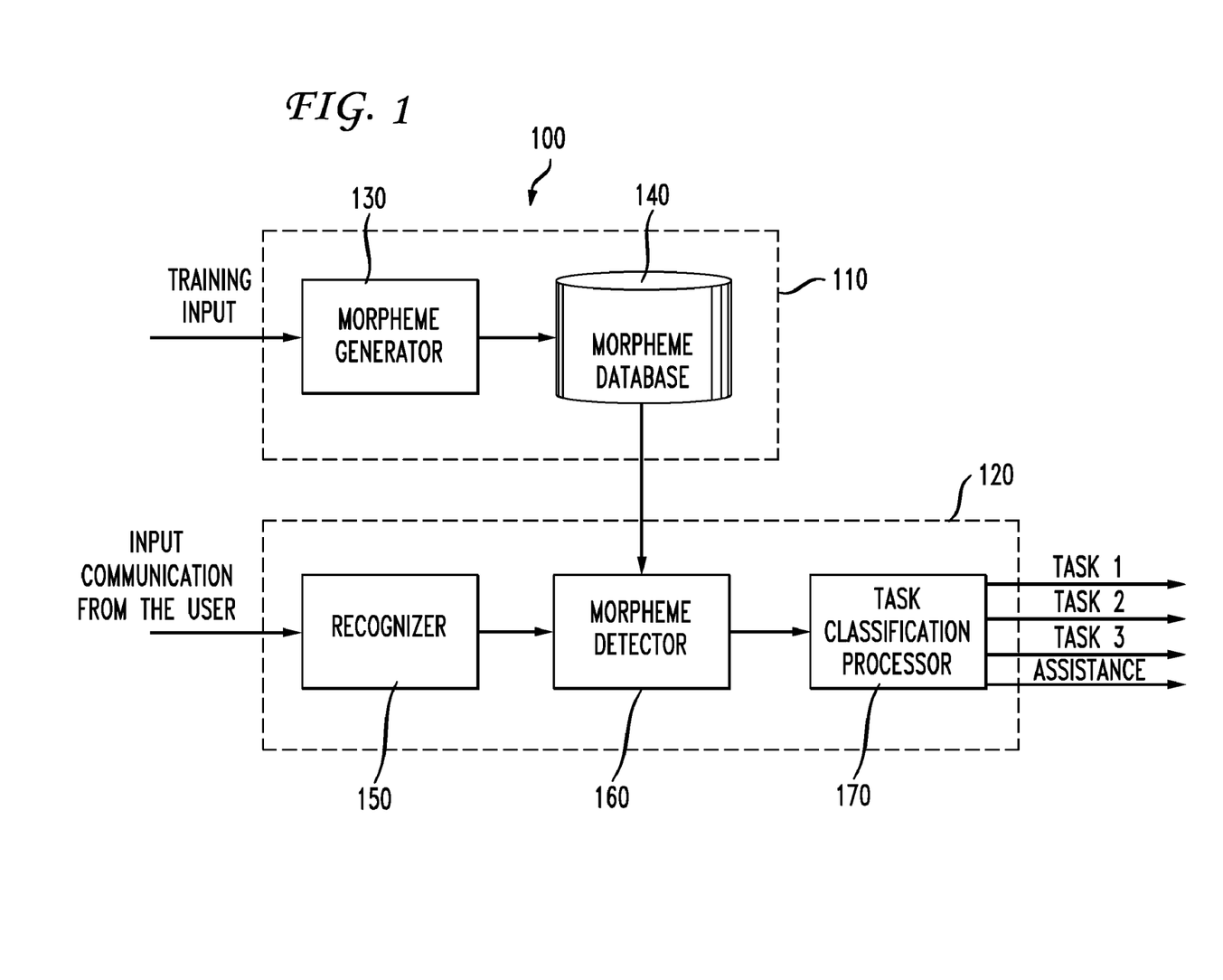
FIG. 1 is a block diagram of an exemplary task classification system.

FIG. 1 is an exemplary block diagram of a possible speech recognition and understanding system 100 that utilizes acoustic morphemes. The speech recognition and understanding system 100 includes two related subsystems, namely a morpheme generation subsystem 110 and input speech classification subsystem 120.

The morpheme generation subsystem 110 includes a morpheme generator 130 and a morpheme database 140. The morpheme generator 130 generates morphemes from a corpus of untranscribed training speech (the invention may also operate with training speech that is transcribed, of course). The generated morphemes are stored in the morpheme database 140 for use by the morpheme detector 160. The morpheme database 140 contains a large number of verbal and non-verbal speech fragments or sub-morphemes (illustrated as phone-phrases for ease of discussion), each of which is related to one or more of a predetermined set of task objectives. Each of the morphemes may be labeled with its associated task objective. The operation of the morpheme generator 130 will described in greater detail with respect to FIGS. 2-4 below.

The input speech classification subsystem 120 includes an input speech recognizer 150, a morpheme detector 160 and a task classification processor 170. The input speech recognizer 150 receives a user's task objective request in the form of verbal and/or non-verbal speech. The input speech recognizer 150 may perform the function of recognizing, or spotting the existence of one or more phones, sub-units, acoustic morphemes, etc. in the user's input speech by any algorithm known to one of ordinary skill in the art. However, the input speech recognizer 150 forms a lattice structure to represent a distribution of recognized phone sequences, such as a probability distribution. The input speech recognizer 150 may extract the n-best phone strings that may be extracted from the lattice, either by themselves or along with their confidence scores. Lattice representations are well known those skilled in the art and are further described in detail below.

While the method of morpheme detection using lattices is shown in the figures as being associated with a task classification system, this is purely exemplary. The method of morpheme detection using lattices may be applied to a wide variety of automated communication systems, including customer care systems, and should not be limited to a task classification system.

The morpheme detector 160 then detects the acoustic and/or non-acoustic morphemes present in the lattice that represents the user's input request. The morphemes generated by the morpheme generation subsystem 110 are provided as an input to the morpheme detector 160.

The output of morpheme detector 160 includes the detected morphemes appearing in the user's task objective request that is then provided to the task classification processor 170. The task classification processor 170 may apply a confidence function, based on the probabilistic relation between the recognized morphemes and selected task objectives, and makes a decision either to implement a particular task objective, or makes a determination that no decision is likely in which case the user may be defaulted to a human or automated system for assistance.

Figure 2:
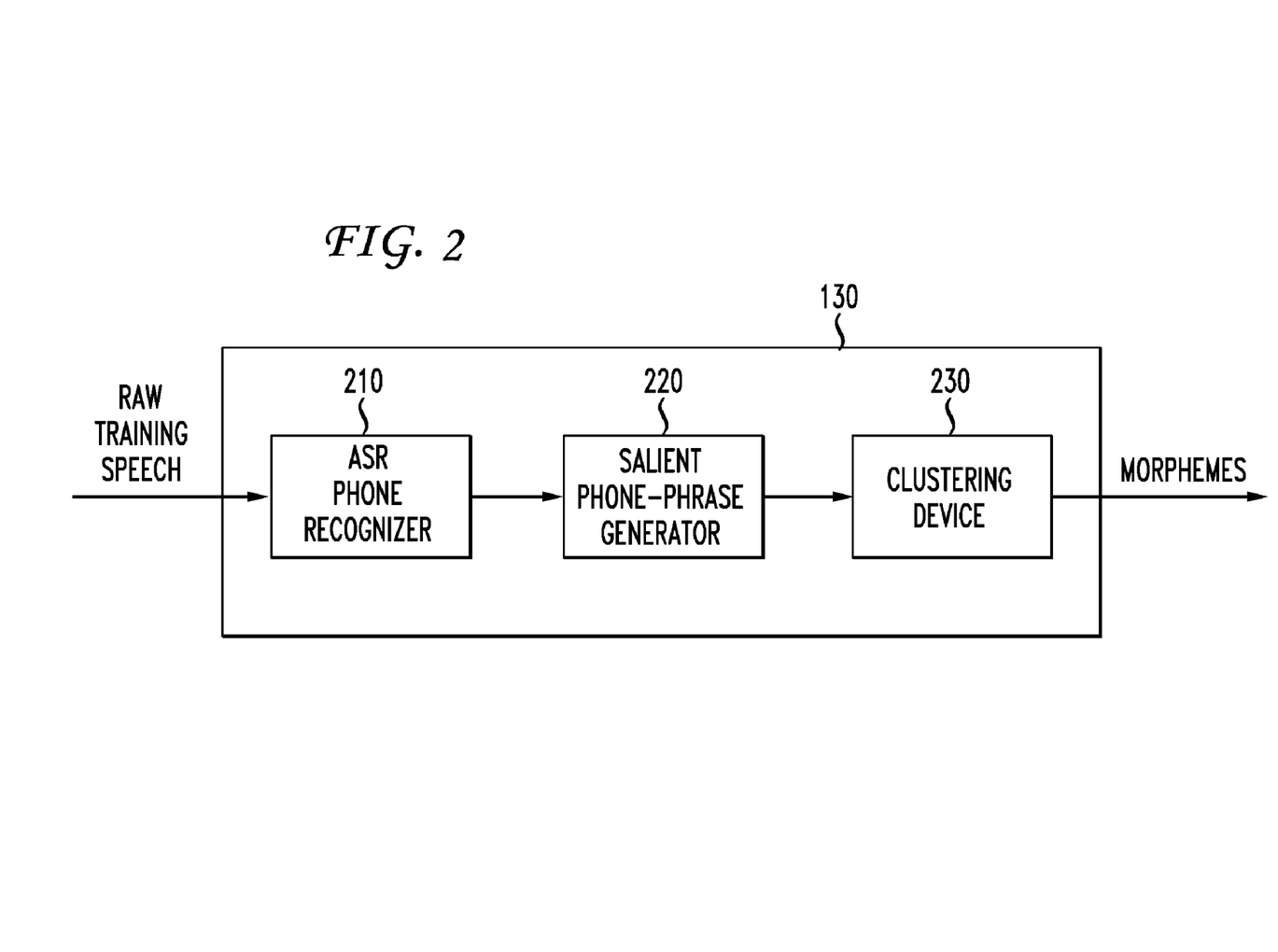
FIG. 2 is a detailed block diagram of an exemplary morpheme generator.

An exemplary process of the invention will now be described with reference to FIGS. 2-4. FIG. 2 is a detailed block diagram of an exemplary morpheme generator 130. The morpheme generator 130 includes an ASR phone recognizer 210, a salient phone-phrase generator 220, and a clustering device 230.

Figure 3:
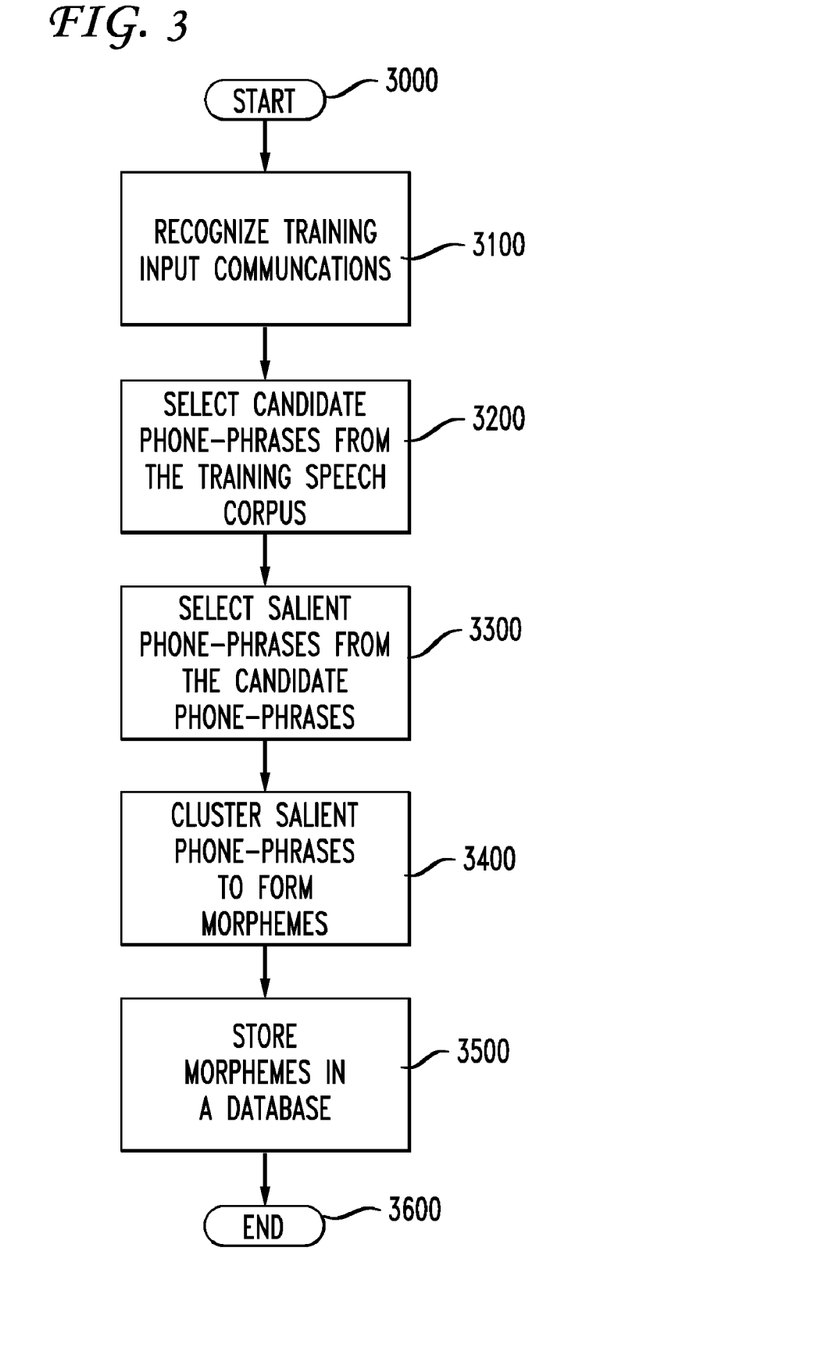
FIG. 3 is a flowchart illustrating an exemplary morpheme generation process.

FIG. 3 illustrates a possible process of generating morphemes using the morpheme generator 130 of FIG. 2. The process begins at step 3000 and proceeds to step 3100 where the ASR phone recognizer 210 receives raw training speech from a database, for example. The database may be generated from recordings of users talking with human agents, responding to the prompt "AT&T. How may I help you?' (HMIHY). The characteristics of this data and early experiments are detailed in U.S. Pat. No. 5,675,707, for example.

In an embodiment for recognizing non-acoustic morphemes, the ASR phone recognizer 210 may be replaced in the figure by a sub-morpheme recognizer. The sub-morpheme recognizer would operate similar to the ASR phone recognizer, but it would receive raw non-acoustic or a mixture of acoustic and non-acoustic training data from a database. However, for each of discussion, use of only acoustic morphemes will be described below.

In addition, while the drawings illustrate the use of phones, this is purely exemplary. Any sub-portion of verbal and/or non-verbal speech may by recognized and detected within the spirit and scope of the invention.

A training set of thousands of spoken utterances with corresponding call-labels is used, followed by using a separate test set in the range of 1000 utterances. They are designated HHS-train and HHS-test, respectively. HHS denotes human/human speech-only.

The ASR phone recognizer 210 that is applied to the training speech is task-independent. In particular, a phonotactic language model was trained on the switchboard corpus using a Variable-Length N-gram Stochastic Automaton. This corpus is unrelated to the HMIHY task, except in that they both comprise fluent English speech. Off-the-shelf telephony acoustic models may be used. Applying the ASR phone recognizer 210 to the HMIHY test speech data yields a phone accuracy of 43%. The training and test sets so generated are denoted by ASR-phone-train and ASR-phone-test respectively.

For a baseline comparison, a 'noiseless' phonetic transcription was generated from the orthographic transcriptions, by replacing each word by its most likely dictionary pronunciation and deleting word-delimiters. E.g. "collect call" is converted to "K ax l eh K TK ao l" (see FIGS. 11 and 12, for example). The data sets are denoted as transcr-phone-train and transcr-phone-test.

Figure 6:
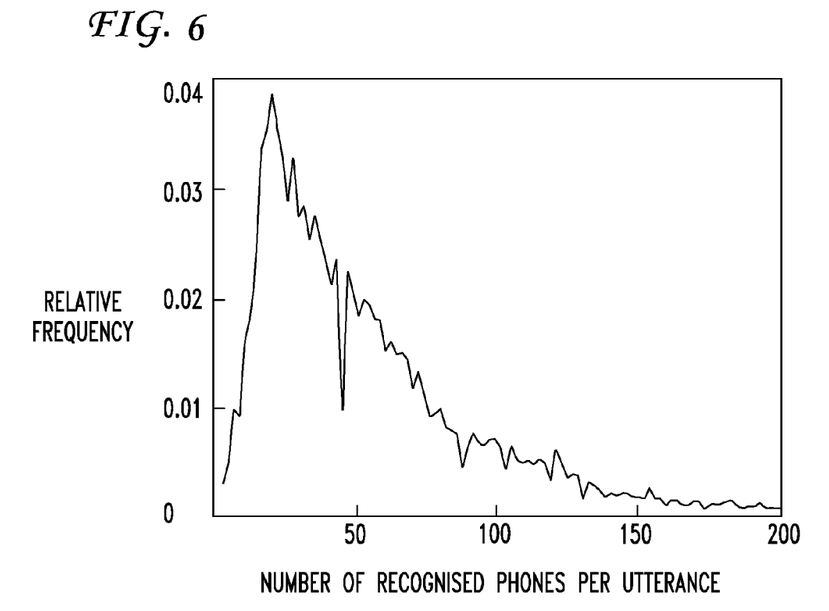
FIG. 6 is a graph illustrating the number of recognized phones per utterance.

The number of recognized phones per utterance is distributed as shown in FIG. 6. The mean length is 54 phones per utterance. The shape of the distribution of time per utterance is similar, with a mean duration of 5.9 seconds.

Figure 7:
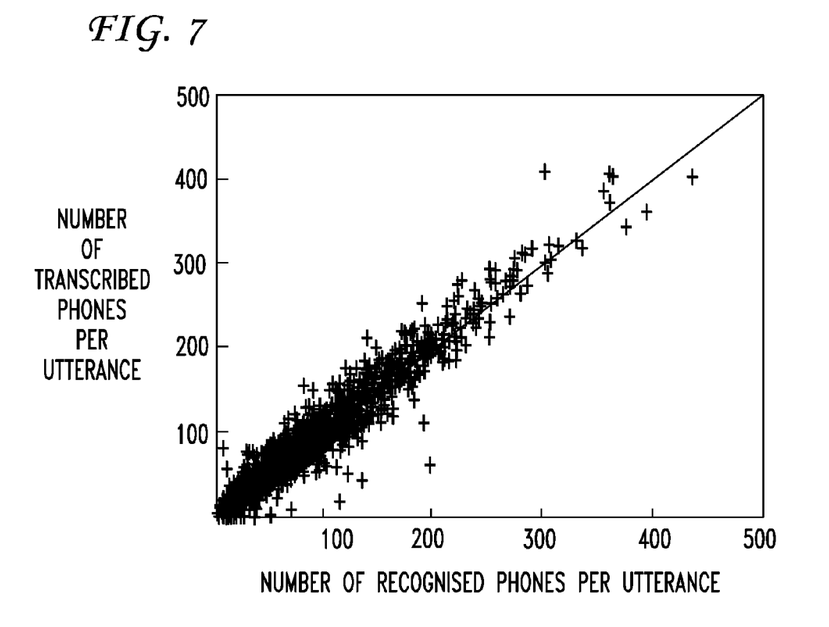
FIG. 7 is a graph illustrating the length comparison of recognized vs. transcribed utterances.

For each utterance, the length of the recognized phone sequence is compared with the length of the phonetic transcription. These values are scatter-plotted in FIG. 7, with the diagonal shown for reference. Observe that in most cases, the transcribed and recognized utterances have approximately the same length. Deviation from the diagonal is in two directions. The above-diagonal points correspond to speech being recognized as background noise or silence. The below-diagonal points correspond to background noise being recognized as speech.

In step 3200, the salient phone-phrase generator 220 selects candidate phone-phrases from the raw training speech corpus. While the system and method of the invention is illustrated and described using the term phone-phrases, it is again important to note that phone-phrases are actually sub-morphemes that may be acoustic or non-acoustic (i.e., made up of non-verbal sub-morphemes such as tablet strokes, gestures, body movements, etc.). However, as discussed above, for ease of discussion, the systems and methods illustrated in the drawings and discussed in the below concern only phone-phrases. Consequently, the invention should not be limited to using just phone-phrases and should encompass the utilization of any sub-units of any known or future method of communication for the purposes of recognition and understanding.

Figure 4:
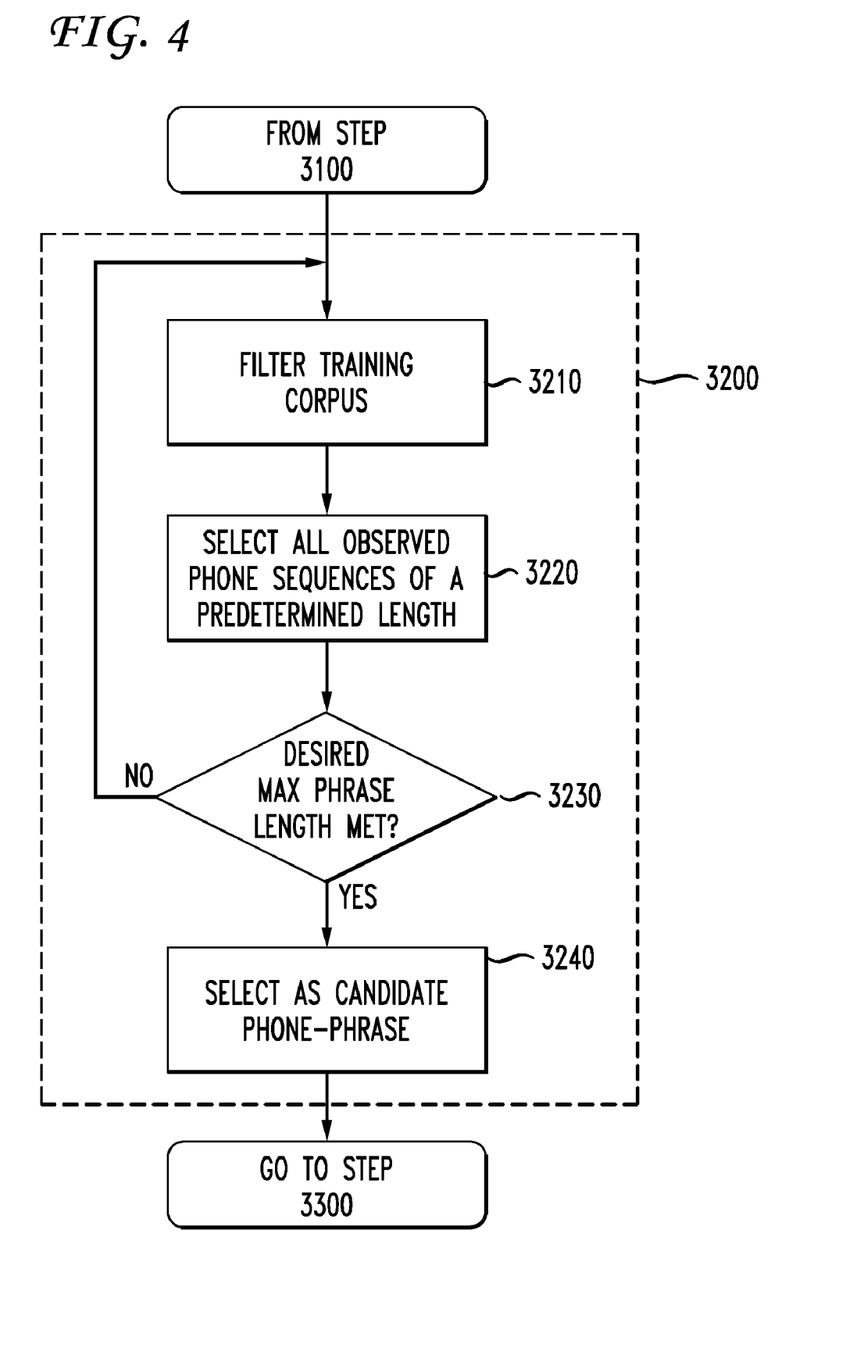
FIG. 4 is a flowchart illustrating an exemplary candidate phone-phrase selection process.

FIG. 4 illustrates a more detailed flowchart of the candidate phone-phrase selection process that takes place in step 3200. In step 3210, the raw training speech corpus is filtered using grammatical inference algorithms, such as those defined in U.S. Pat. No. 5,675,707. As a result of the filtering process, in step 3220, all observed phone sequences of the predetermined length are selected. In step 3230, he salient phone-phrase generator 220 determines whether the desired maximum phrase length has been met. If the desired maximum phrase length has been met, in step 3240, the salient phone-phrase generator 220 selects the phone sequence as a candidate phone-phrase. Conversely, if the desired maximum phrase length has not been met, the process returns to step 3210 to resume filtering the training speech corpus.

Figure 11:
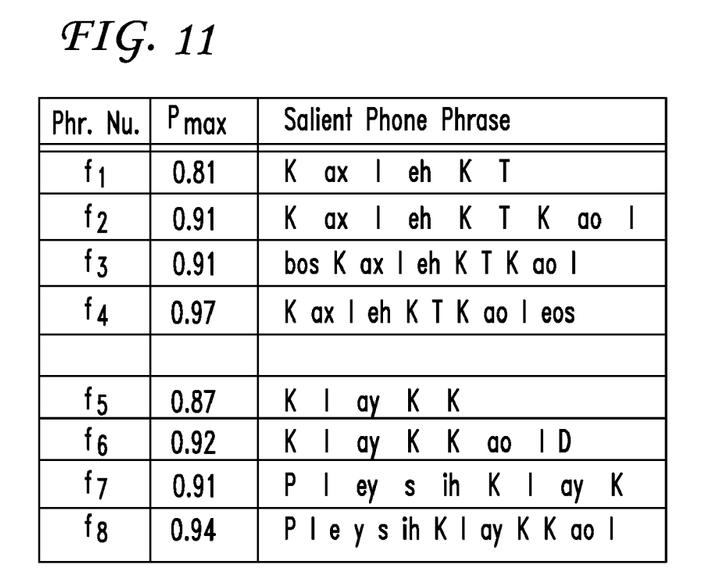
FIG. 11 illustrates examples of salient phone-phrases for "collect"

Once the candidate phone-phrases have been selected, in step 3300, the salient phone-phrase generator 220 selects a subset of the candidate phone-phrases. Thus, new units are acquired by the above process of searching the space of observed phone-sequences and selecting a subset according to their utility for recognition and understanding. The resultant subset selected is denoted as salient phone-phrases. Examples of salient phone-phrases for the word "collect" are shown in FIG. 11.

The salient phone-phrase generator 220 may perform the selection of salient phone-phrases by first using a simplified measure of the candidate phone-phrase's salience for the task as the maximum of the a posteriori distribution, $$P_{max}(f) = \max_{C} Pr(C | f),$$

where C varies over the 15 call-types in the HMIHY task. The salient phone-phrases are then selected by applying a threshold on $P_{max}$ and by using a multinomial statistical significance test. This significance test excludes low-frequency phrases for which a fortunate conjunction of events can give a high appearance salience purely by chance. It tests the hypothesis that the observed call-type count distribution is a sample from the prior distribution.

Figure 12:
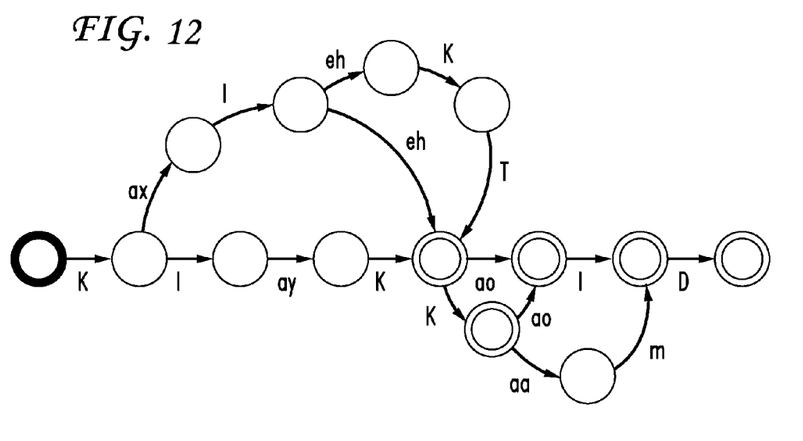
FIG. 12 illustrates an example of an acoustic morpheme for "collect"

In step 3400, the salient phone-phrases are clustered into acoustic morphemes by the clustering device 230. FIG. 12 shows an example of acoustic morpheme containing the word "collect". The clustering is achieved using a combination of string and semantic distortion measures using methods, for example, such as those in U.S. Pat. No. 6,173,261. Each cluster is then compactly represented as a finite state machine and stored in the acoustic morpheme database 140. The acoustic morphemes stored in the acoustic morpheme database 140 may then be used in the task classification process shown in FIG. 5.

The example below illustrates this acoustic morpheme generation process. Consider a candidate phone-phrase, $$f = p_1 p_2 \ldots p_n,$$

where $p_i$ are phones. Denote its frequency by F(f). A measure of its utility for recognition is the mutual information of its components, denoted MI(f), which may be approximated via $$MI(f) = MI(p_1 p_2 \ldots p_{n-1}; p_n).$$

As discussed above, a simplified measure of its salience for the task is the maximum of the a posteriori distribution, $$P_{max}(f) = \max_{C} Pr(C | f),$$

where C varies over the 15 call-types in the HMIHY task.

Figure 8:
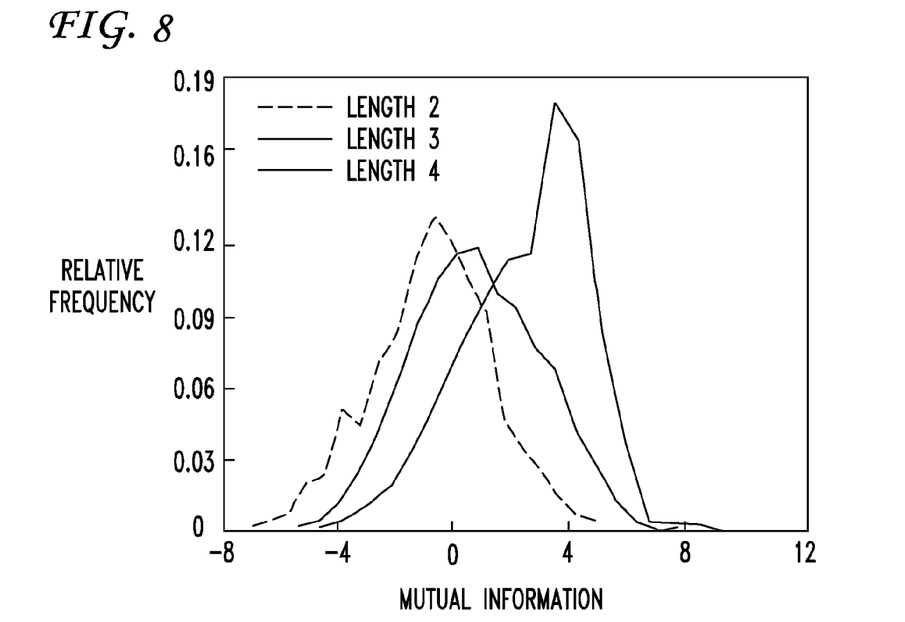
FIG. 8 is a graph illustrating the mutual information (MI) of phone-phrases, showing increased MI as their length increases.

These features for phone-phrases observed in the noise-free case are characterized transcr-phone-train. In FIG. 8, the MI distributions of these phone-phrases are shown for lengths 2-4. It can be observed that the MI distributions shift positively as length increases, corroborating the increased predictive power of longer units. It can also be observed, however, that while many of these phrases have positive predictive power (MI>O), many do not. Thus, for constructing larger units from smaller ones, attention is restricted to the positive tail of these MI distributions.

Figure 9:
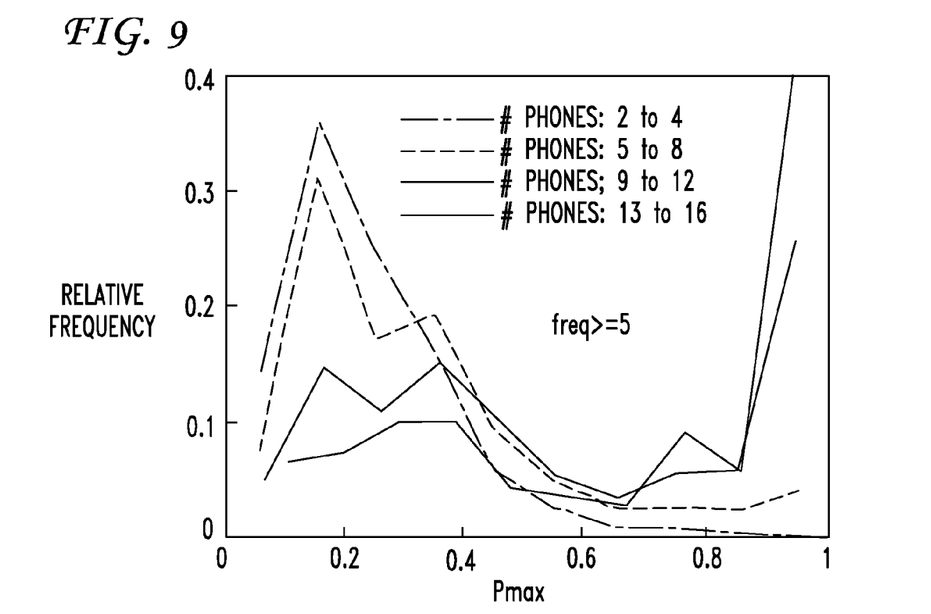
FIG. 9 is a graph illustrating the $P_{max}$ of phone-phrases, showing more phrases with high $P_{max}$ as their length increases.

For each of these phone-phrases, $P_{max}(f)$ is computed, which is a measure of the salience of a phrase for the task. FIG. 9 shows the distribution of $P_{max}$ for varying length phrases. It can be observed that for single phones, $P_{max}$ is near-random, corroborating the intuition that semantics is carried by longer phone-phrases. It can also be observed that the positive shift in the distributions as length increases. In particular, focus on the region $P_{max}>0.9$, which corresponds to highly salient phone-phrases. As length increases, more of these highly salient phrases are discovered.

The goal of this process is to grow the phone-phrases until they have the salience of words and word-phrases. Thus, the search criteria for selecting longer units is a combination of their utility for within-language prediction, as measured by MI, and their utility for the task, as measured by $P_{max}$. For phrases with large $P_{max}$, the MI of the phrase tends to be larger than average. This correlation was exploited successfully for frequency-compensated salience in earlier experiments discussed above, but is not exploited here. In the earlier experiments, a set of salient phone-phrases of length $\leq 16$ was generated via a two-pass process as follows:

Select phone-phrases with $F(f) \geqq 5$ and length $\leqq 4$;

Filter the training corpus ASR-phone-train with those phrases, using a left-right top-down filter with the phrases prioritized by length.

Select subsequences from the filtered corpus of fragment-length $\leqq 4$, (i.e. with #phones$\leqq 16$) and with $MI \geqq 1$ and $P_{max} \geqq 0.5$.

Figure 10:
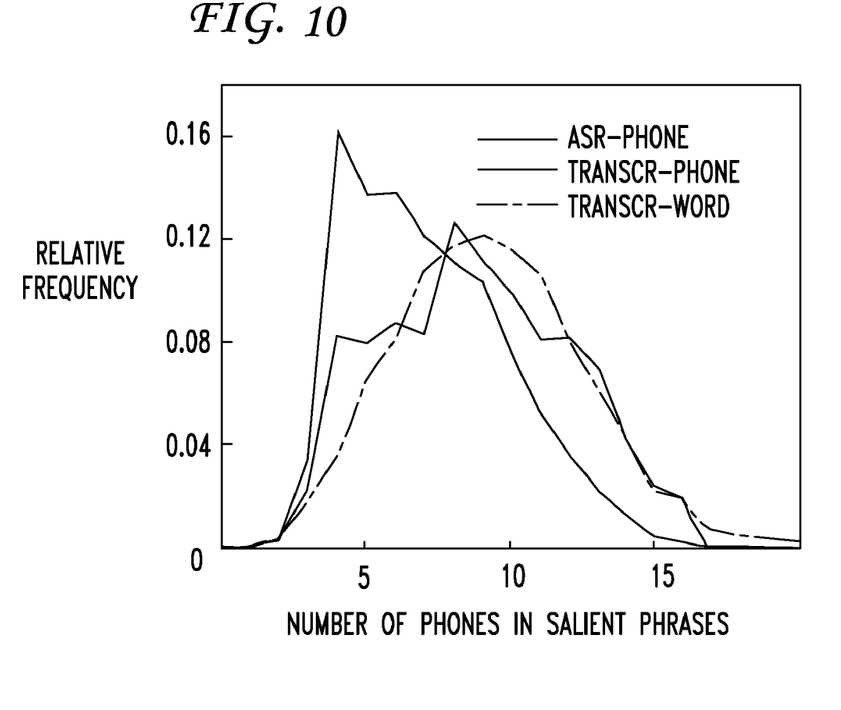
FIG. 10 is a graph illustrating the length of salient phone-phrases.

This particular iterative selection process was selected based on ease of implementation should not be considered optimal. The resultant set of salient phone-phrases have lengths $\leqq 16$, distributed as shown in FIG. 10.

Figure 5:
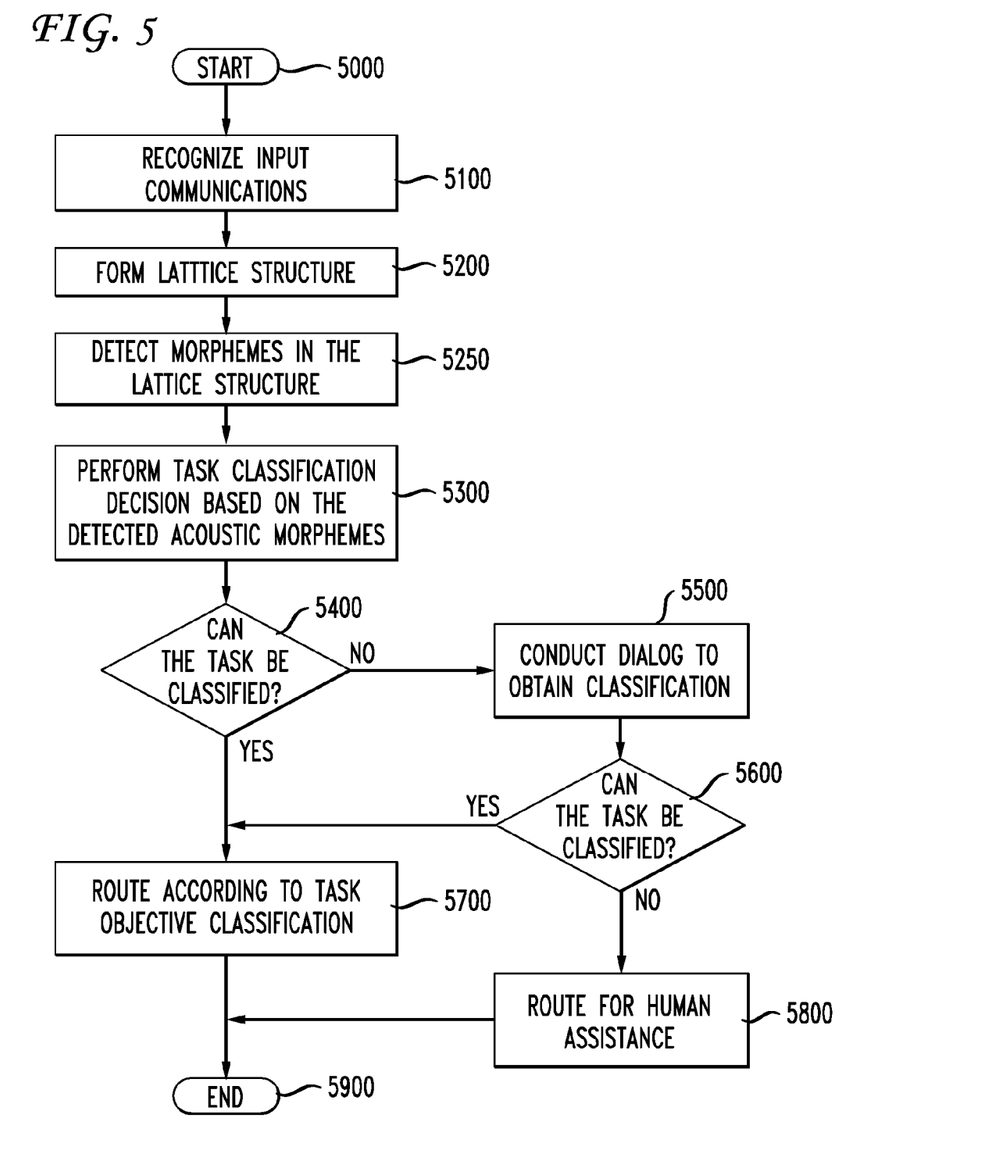
FIG. 5 is a flowchart of an exemplary task classification process.

FIG. 5 is a flowchart of a possible task classification process using acoustic morphemes. The process begins at step 5000 and proceeds to step 5100 where input speech recognizer 150 receives an input communication, such as speech, from a user, customer, etc. The input speech may, of course, be expressed in verbal speech, non-verbal speech, multimodal forms, or using a mix of verbal and non-verbal speech.

Non-verbal speech may include but are not limited to gestures, body movements, head movements, non-responses, text, keyboard entries, keypad entries, mouse clicks, DTMF codes, pointers, stylus, cable set-top box entries, graphical user interface entries and touchscreen entries, or a combination thereof. Multimodal information is received using multiple channels (i.e., aural, visual, etc.). The user's input communication may also be derived from the verbal and non-verbal speech and the user's or the machine's environment. Basically, any manner of communication falls within the intended scope of the invention. For example, the input communication may also be derived from the user's actions, including a detected focus of attention of the user. However, for ease of discussion, the invention will be described with respect to verbal speech in the examples and embodiments set forth below.

Figure 13:
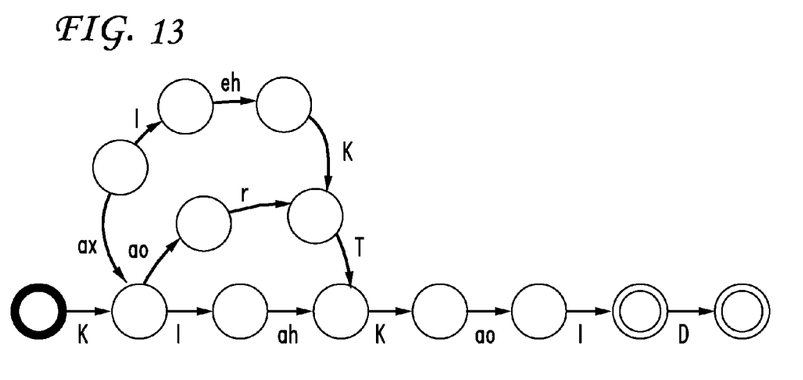
FIG. 13 illustrates an example of an acoustic morpheme lattice for "collect"

Working with the output of the non-perfect input speech recognizer 150 introduces the problem of the coverage of the user's input with the acoustic morphemes. To counter this problem, in step 5200, a lattice structure is formed to improve the coverage of the recognizer 150. Lattices are efficient representations of a distribution of alternative hypothesis. A simple example of a lattice network, resulting from the utterance "collect call", is shown in FIG. 13, where a bold circle represents an initial state and a double circle a final state. The most likely phone sequence of the transcribed utterance is "K ax l eh K T K ao l", and the best path of the input speech phone recognizer 150 is "K I ah K ao l". Whereas the salient phone-phrase "K ax l eh K T K ao l" is not present in the best path, it does appear in the lattice network. Exploiting lattices results in additional matches of the salient phrases in the utterances, as compared to searching only in the best paths.

In speech recognition, the weights (likelihoods) of the paths of the lattices are interpreted as negative logarithms of the probabilities. For practical purposes, the pruned network will be considered. In this case, the beam search is restricted in the lattice output, by considering only the paths with probabilities above a certain threshold relative to the best path. The threshold r is defined as: $r_i \leqq r$, with $r_i = p_i/p_1$, where $p_i$ is the probability of the $i^{th}$ path and $p_1$ is the probability of the best path.

Figure 14:
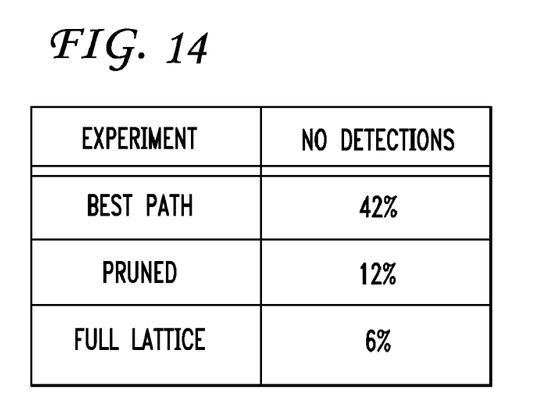
FIG. 14 is an exemplary chart illustrating the experimental non-detection rates for best path, pruned lattice, and full lattice structures.

In order to quantify the coverage, the number of test sentences are first measured with no detected occurrences of acoustic morphemes, for the experiments using best paths, pruned lattices and full lattices. These numbers are illustrated in FIG. 14. Observe that 42% of the best path sentences have no detected acoustic morphemes. When the search of the acoustic morphemes is expanded to the pruned lattices, the number of sentences with no detections decreases to 12%. This number drops down to 6% when full lattices are used for the search.

Figure 15:
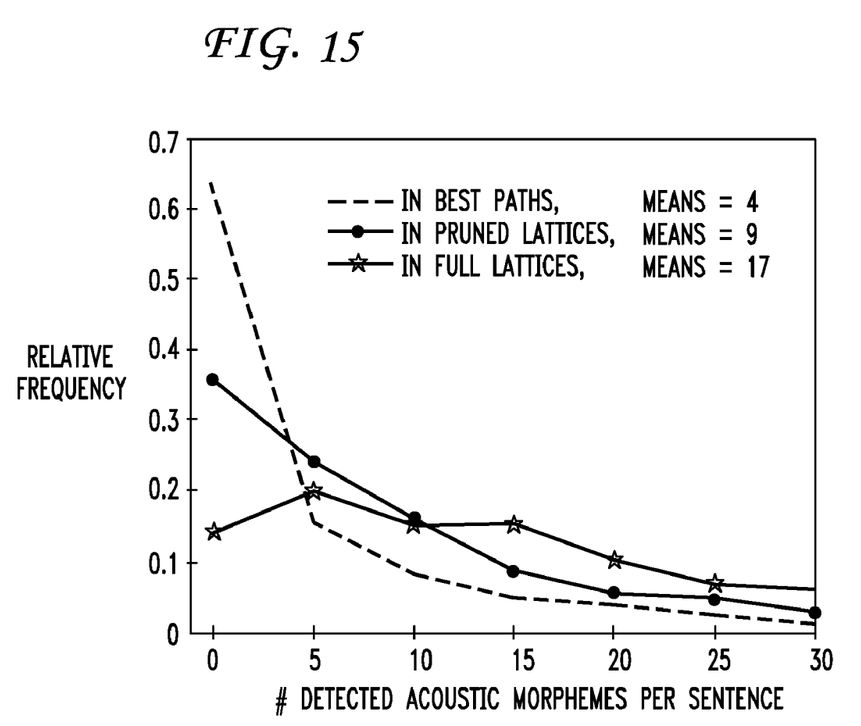
FIG. 15 is a graph illustrating the experimental number of detected acoustic morphemes per sentence.

The relative frequency distributions of the number of detected acoustic morphemes in the best paths, in the pruned lattices, and in the full network experiments, are shown in FIG. 15. As expected, the number of detections increases in the experiments using lattices.

As shown above, expanding the search of the acoustic morphemes in the lattice network results in improved coverage of the test sentences. It is of course accompanied by an increased number of false detections of the acoustic morphemes. In order to study in more detail the false detection issue, it is beneficial to focus on one particular morpheme $F_c$, strongly associated to the call-type c=collect. Its occurrences in the best paths will be compared with its occurrences in the lattice network. The salient phone-phrases clustered in this morpheme represent variations of the phrase "collect call". A subgraph of this morpheme was shown in FIG. 12. Its salience on the training set is $P(c|F_c) = 0.89$. The following notation: W={manually chosen word sequences corresponding to $F_c$} is introduced.

Figure 16:
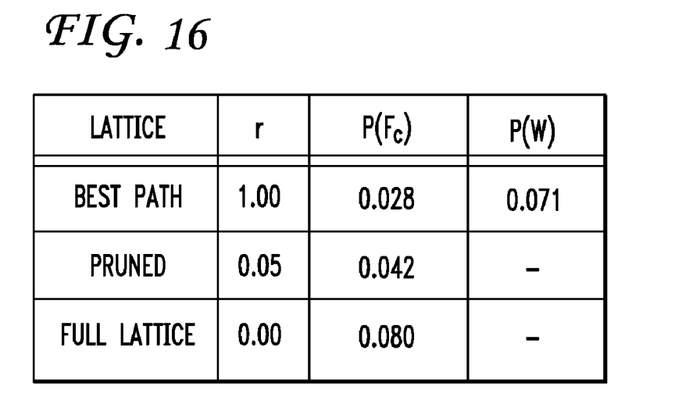
FIG. 16 is an exemplary chart illustrating the experimental statistics of a particular acoustic morpheme $F_c$.

FIG. 16 shows the comparison of the coverage of the test utterances with the acoustic morpheme $F_c$, on the best paths and on the lattice network. $F_c$ is detected in 3% of the best paths. Searching in the full lattice network, increases this coverage to 8%. However, in transcr-word-test, the word sequences corresponding to the Acoustic Morpheme $F_c$ are present in only 7% of the transcribed sentences.

Figure 17:
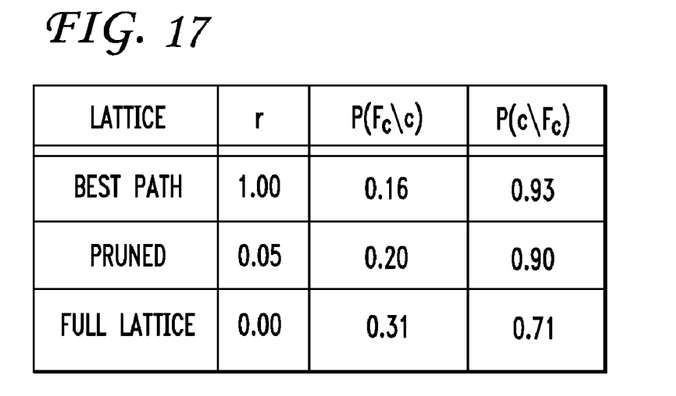
FIG. 17 is an exemplary chart illustrating the experimental detection of a particular acoustic morpheme $F_c$ given the call-type and its salience.

FIG. 17 illustrates the relationship between the detections of $F_c$ given the call-type, $P(F_c|c)$ and its salience, $P(c|Fc)$, measured on the test set. As shown in the table, the number of detections of this morpheme given the call-type increases from 15% in the case of the best paths, to 31% in the case of the full lattice search. In parallel, a decrease in the salience from 93% to 71% is observed. This is an indication that the high salience of this morpheme on the best paths is conserved in the pruned lattices, but not in the full lattices.

Figure 18:
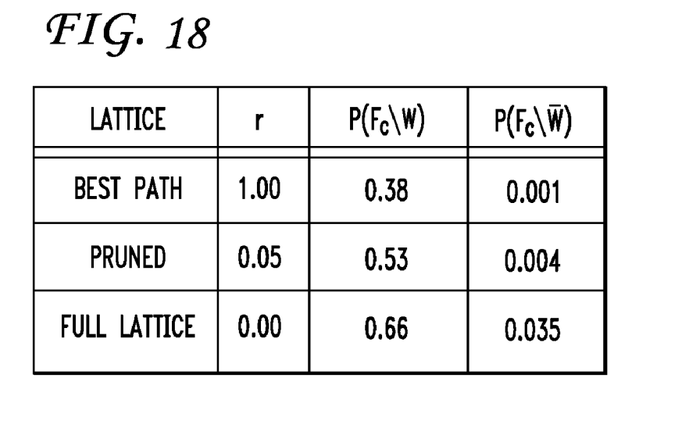
FIG. 18 is an exemplary chart illustrating the experimental recognition accuracy of a particular acoustic morpheme $F_c$.

FIG. 18 illustrates the recognition accuracy of the Acoustic Morpheme $F_c$, as compared to the transcribed text. The probabilities $P(F_c|W)$ and $P(F_c|\overline{W})$ indicate how often the acoustic morpheme is found in the ASR phone output, given that it is known that the corresponding word sequences are present (or not) in the transcribed sentences. Searching in the full lattice increases the number of detected occurrences of $F_c$ from 38% up to 66%, albeit with a parallel increase of the falsely detected morphemes.

In step 5250, the acoustic morpheme detector 160 detects acoustic morphemes that have been recognized and formed into a lattice structure by the input speech recognizer 150 using the acoustic morphemes stored in the acoustic morpheme database 140. In step 5300, the task classification processor 170 performs task classifications based on the detected acoustic morphemes. The task classification processor 170 may apply a confidence function based on the probabilistic relation between the recognized acoustic morphemes and selected task objectives, for example. In step 5400, the task classification processor 170 determines whether a task can be classified based on the detected acoustic morpheme. If the task can be classified, in step 5700, the task classification processor 170 routes the user/customer according to the classified task objective. The process then goes to step 5900 and ends.

If the task cannot be classified in step 5400 (i.e. a low confidence level has been generated), in step 5500, a dialog module (located internally or externally) the task classification processor 170 conducts dialog with the user/customer to obtain clarification of the task objective. After dialog has been conducted with the user/customer, in step 5600, the task classification processor 170 determines whether the task can now be classified based on the additional dialog. If the task can be classified, the process proceeds to step 5700 and the user/customer is routed in accordance with the classified task objective and the process ends at step 5900. However, if task can still not be classified, in step 5800, the user/customer is routed to a human for assistance and then the process goes to step 5900 and ends An experiment evaluating the utility of these methods in the HMIHY task was conducted. A classifier was trained from the output of a phone recognizer on 7462 utterances, which was denoted ASR-phone-train. Salient phone-phrases of length $\leq 16$ were selected, as described above. The salient phone-phrases were then clustered into salient grammar fragments. A single-layer neural net was trained with these fragments as input features. The resultant classifier was applied to the 1000 utterance test-set, ASR-phone-test.

The call-classification results are scored following the methodology of U.S. Pat. No. 5,675,707. In this method, an utterance is classified by the system as one of 14 call-types or rejected as 'other'. Rejection is based on a salience-threshold for the resulting classification. One dimension of performance is the False Rejection Rate (FRR), which is the probability that an utterance is rejected in the case that the user wanted one of the call-types. The cost of such an error is a lost opportunity for automation. The second dimension of performance is the Probability of Correct Classification ($P_c$) when the machine attempts a decision. The cost of such an error is that of recovery via dialog. Varying the rejection threshold traces a performance curve with axes $P_c$ and FRR.

Searching in the lattice network will introduce the additional problem of multiple detections of the acoustic morphemes on different levels of the lattice network, and the issue of combining them optimally. For an evaluation of the usefulness of the phone lattices, the problem of treating multiple detections will be deferred from different levels of the network, and stop our search in the lattice network as soon as a sentence with one or more detections is found. The existing call-type classifier is modified in the following way: for the test sentences without detected occurrences of the acoustic morphemes in the best paths, the search is expanded in the lattice network and stops as soon as a sentence with one or more detections is found.

Figure 19:
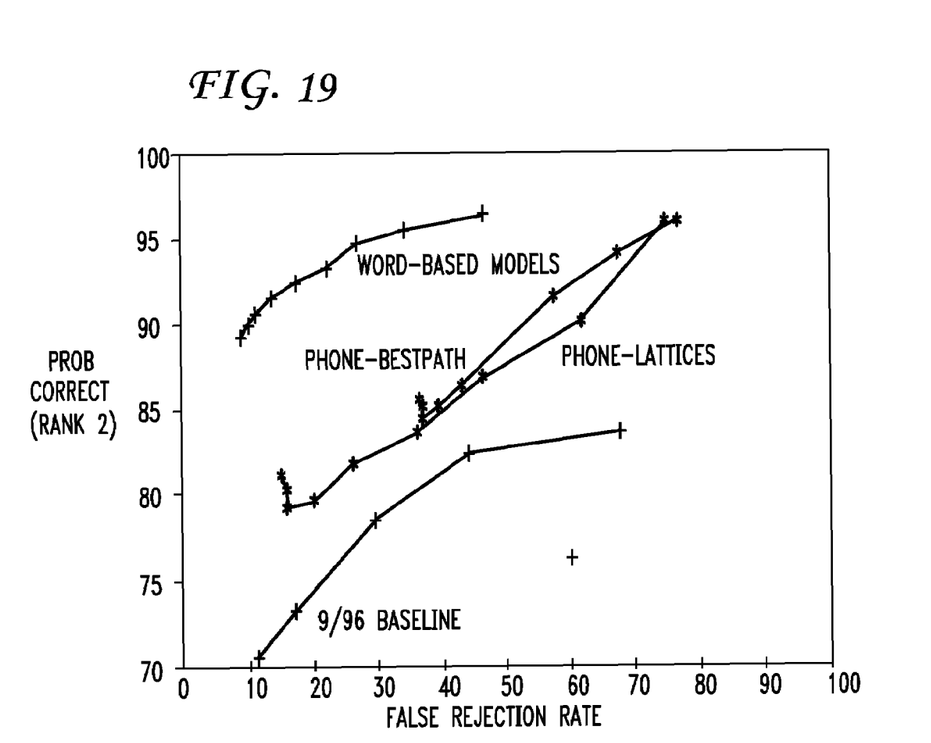
FIG. 19 is a graph illustrating the experimental call-classification performance on speech using acoustic morphemes.

FIG. 19 shows the results of call-classification experiments trained on word transcriptions, and exploiting spoken language understanding with utterance verification compared with the utility of the detected occurrences of the acoustic morphemes in the pruned lattice test sentences. Using this new lattice-based detection method, an operating point with 81% correct classification rate is achieved at rank 2, with 15% false rejection rate. This is a reduction of 59% from the previous false rejection rate using best paths, albeit with a 5% reduction in the correct classification performance from that baseline.

As shown in FIGS. 1 and 2, the method of this invention may be implemented using a programmed processor. However, method can also be implemented on a general-purpose or a special purpose computer, a programmed microprocessor or microcontroller, peripheral integrated circuit elements, an application-specific integrated circuit (ASIC) or other integrated circuits, hardware/electronic logic circuits, such as a discrete element circuit, a programmable logic device, such as a PLD, PLA, FPGA, or PAL, or the like. In general, any device on which the finite state machine capable of implementing the flowcharts shown in FIGS. 3-5 can be used to implement the speech recognition and understanding system functions of this invention.

While the invention has been described with reference to the above embodiments, it is to be understood that these embodiments are purely exemplary in nature. Thus, the invention is not restricted to the particular forms shown in the foregoing embodiments. Various modifications and alterations can be made thereto without departing from the spirit and scope of the invention.

What is claimed is:

1. A method of task classification which operates on one or more task objectives of a user, comprising:
forming a lattice of phone strings representing morphemes in a user's input communication, the lattice representing a distribution over the phone strings;
detecting morphemes in the user's input communication using the formed lattice; and
making task-type classification decisions based on the detected morphemes in the user's input communication.

2. An automated task classification system that detects morphemes using lattices and operates on one or more task objectives of a user, comprising:
a recognizer that forms a lattice of phone strings representing morphemes in a user's input communication, the lattice representing a distribution over the phone strings;
a morpheme detector that detects morphemes in the user's input communication using the formed lattice; and
a task classification processor that makes task-type classification decisions based on the detected morphemes in the user's input communication.

3. The automated task classification system of claim 2, wherein the morphemes include verbal speech.

4. The automated task classification system of claim 3, wherein the morphemes further comprise non-verbal sub-morphemes comprising at least one of gestures, body movements, head movements, non-responses, text, keyboard entries, keypad entries, mouse clicks, DTMF codes, pointers, stylus, cable set-top box entries, graphical user interface entries and touchscreen entries.

5. The automated task classification system of claim 2, wherein the morphemes are expressed in multimodal form.

6. The automated task classification system of claim 2, wherein the user's input communication is derived from the verbal and non-verbal speech and the user's environment.

7. The automated task classification system of claim 2, wherein the morphemes in the user's input communication include sub-morphemes that are derived from the user's actions, including the user's focus of attention.

8. The automated task classification system of claim 2, wherein the task classification processor enters into a dialog with the user to obtain a feedback response from the user.

9. The automated task classification system of claim 2, wherein the task classification processor prompts the user to provide a feedback response includes additional information with respect to the user's initial input communication.

10. The automated task classification system of claim 2, wherein the task classification processor prompts the user to provide a feedback response that includes confirmation with respect to at least one of the set of task objectives determined in the classification decision.

11. The automated task classification system of claim 2, wherein the task classification processor routes the user's input communication based on the classification decision.

12. The automated task classification system of claim 2, wherein the task objective is performed after the task classification processor routes the user's input communication.

13. The automated task classification system of claim 2, wherein the system operates in conjunction with one or more communication networks, the one or more communication networks including at least one of a telephone network, the Internet, an intranet, Cable TV network, a local area network (LAN), and a wireless communication network.

14. The automated task classification system of claim 2, wherein the system is used for customer care purposes.

15. The automated task classification system of claim 2, wherein the classification decisions and corresponding user input communications are collected for automated learning purposes.

* * * * *